United States Patent
Toelke

[15] 3,656,711
[45] Apr. 18, 1972

[54] THERMOSET PLASTIC BALL VALVE

[72] Inventor: Lester W. Toelke, Houston, Tex.

[73] Assignee: Encon Manufacturing Company

[22] Filed: Aug. 17, 1970

[21] Appl. No.: 64,279

[52] U.S. Cl..............................251/151, 251/174, 251/315, 251/317, 251/368
[51] Int. Cl........................................F16k 51/00
[58] Field of Search.................251/148, 152, 174, 314, 315, 251/316, 317, 368, 151

[56] References Cited

UNITED STATES PATENTS

| | | | |
|---|---|---|---|
| 3,540,693 | 11/1970 | Wise | 251/315 |
| 2,950,081 | 8/1960 | Steinbach | 251/368 X |
| 3,176,713 | 4/1965 | McDermott | 251/368 X |
| 3,395,890 | 8/1968 | Eckert | 251/368 X |
| 2,628,060 | 2/1953 | Parker | 251/174 |
| 3,132,836 | 5/1964 | Dickerson | 251/368 X |
| 3,394,916 | 7/1968 | Birr | 251/315 |
| 3,526,386 | 9/1970 | Gachot | 251/366 |

Primary Examiner—Harold W. Weakley
Attorney—Jack W. Hayden

[57] ABSTRACT

A thermoset, noncircular plastic valve ball is rotatably mounted in a valve chamber formed in a thermoset, ported plastic valve body which is adapted to be secured between a pair of thermoset, ported plastic end caps. A thermoset plastic valve stem extends through the wall of the valve body and is engaged with the valve ball. Self-adjusting annular sealing structures are located at the valve body ports for forming fluid tight seals with the noncircular valve ball. The valve body, end caps, valve ball, and valve stem incorporate a fiber reinforcing. Any amount up to approximately 99 percent of the total number of fibers is greater than one-sixteenth inch in length, but preferably at least the majority of the fibers is greater than one-sixteenth inch in length.

12 Claims, 5 Drawing Figures

Lester W. Toelke
INVENTOR

BY Jack W. Hayden
&
Richard E. Bee
ATTORNEYS

Lester W. Toelke
INVENTOR

BY Jack W. Hayden
&
Richard E. Bee
ATTORNEYS

THERMOSET PLASTIC BALL VALVE

BACKGROUND OF THE INVENTION

This invention relates to ball valves for controlling the flow of fluids in fluid flow lines and pipes and the like.

In a number of industrial applications, various advantages and savings may be realized by utilizing all plastic valves for controlling the flow of fluids in fluid flow lines. For example, where fluids are of a highly corrosive nature, the plastic valve of the present invention may be constructed of one of the various presently available plastic materials having a high degree of resistance to the corrosive action of the fluid. In addition to providing longer valve life, such valves would be somewhat less expensive in terms of original cost than other types of valves, such as by way of example stainless steel, titanium and monel valves, which are presently used in these situations.

Various attempts have been heretofore made to construct a practical form of all plastic valve. As far as is known, none of these efforts has succeeded in producing an entirely practical and reliable form of valve for extended use in rigorous industrial applications. A common failure of the heretofore proposed plastic valves is that they do not possess sufficient strength and other characteristics to withstand for a very great length of time or at elevated temperatures the various fluid pressures and mechanical forces to which they are subjected. For example, the strength of thermoplastic resins decreases with an increase in temperature whereas the present invention, by employing a thermosetting resin, maintains its mechanical and chemical characteristics at temperatures of 300° F. or greater while also maintaining excellent resistance to chemicals or corrosive fluid passing therethrough.

Heretofore, thermoset resins have been considered somewhat difficult to mold where it is desirable or necessary to maintain uniform close tolerances and interchangeability of molded parts.

Also, another difficulty encountered in molding a valve is the problem of trying to utilize the same mold for various thermoset resins while obtaining a molded valve whose parts fit satisfactorily to perform their intended and desired function.

As a consequence, there have been various alternate proposals for constructing partially plastic valves which use both metal and plastic parts. Thus, it has been proposed to use a basically metal valve having plastic liners covering the flow passages and other parts which are exposed to the fluid being handled. This form of construction, however, has various disadvantages. Among other things, there is the problem which results from the fact that the coefficient of thermal expansion of the plastic material is usually considerably different from that of the metal parts. Additionally, this form of construction may tend to be somewhat more expensive than would be the case for an all plastic valve. Also, it is difficult, if not substantially impossible to mold a spherical plastic ball for a ball valve, so that it is difficult to attain and maintain a satisfactory seal. The manner of connecting prior art plastic valves in conduits is not entirely satisfactory in that repair or replacement may be time consuming and the manner of threadedly connecting the valve in a conduit may place undue stresses on the valve components which may give rise to premature failure.

SUMMARY OF THE INVENTION

It is an object of the invention, therefore, to provide a new and improved valve which is essentially of an all plastic construction and which avoids one or more of the limitations of such valves heretofore proposed.

It is another object of the invention to provide a new and improved plastic valve having a relatively high degree of mechanical strength.

It is a further object of the invention to provide a new and improved plastic valve which is relatively inexpensive to manufacture.

It is an additional object of the invention to provide a new and improved plastic ball valve for use in a fluid flow line and which is relatively easy to repair or replace.

In accordance with the invention, there is provided a ball valve which includes parts that are formed of a reinforced, thermoset plastic. Such parts include a housing having a flow passage extending therethrough and a valve chamber intersecting such flow passage at an intermediate location; a plastic valve ball which is adapted to be rotatably mounted in the valve chamber and having a flow passage extending therethrough which can be rotated into alignment with the housing flow passage; and a valve stem means extending through the wall of the housing for enabling rotation of the valve ball.

A still further object of the invention is to provide a floating seal arrangement for a plastic ball valve so that a proper seal may be attained and maintained even though the ball is nonspherical.

Yet a further object of the present invention is to incorporate a reinforcing in a plastic ball valve to aid in increasing its strength.

Still another object of the invention is to provide a thermoset plastic valve body with thermoset end caps and a threaded arrangement in the plastic end caps for connection with a conduit in a manner which aids in reducing the radial expansion and possible rupture of the end caps.

A further object of the invention is to provide a thermoset plastic valve body with thermoset plastic end caps having an arrangement therein for either threadedly receiving a conduit or for chemically welding the conduit with the end caps, as may be desired.

Still a further object of the invention is to provide a seal arrangement for a ball valve formed of a thermoset resin which seal arrangement will function properly with a valve formed of any thermoset resin molded in the same mold.

A further object of the invention is to provide a thermoset plastic valve body with thermoset plastic end caps, the end caps including a tubular section connected therewith and flange means for connection with a flange in a conduit.

A further object of the invention is to provide a thermoset plastic ball valve with a seal arrangement constructed and arranged for sealing with a noncircular ball valve and in the valve chamber of a valve housing where the valve chamber for the ball valve need not be maintained at critical tolerances during molding, regardless of the type thermoset plastic.

A still further object of the invention is to mold a thermoset plastic ball valve having reinforcing fibers randomly positioned therein. Any amount up to approximately 99 percent of the total number of fibers is greater than one-sixteenth inch in length and preferably at least the majority of the fibers is greater than one-sixteenth inch in length.

A still further object of the invention is to mold a thermoset plastic ball valve having reinforcing fibers randomly positioned therein.

A still further object of the invention is to mold a thermoset plastic ball valve having as reinforcing glass fibers randomly positioned therein. Any amount up to approximately 99 percent of the total number of glass fibers is greater than one-sixteenth inch in length and preferably at least the majority of the glass fibers is greater than one-sixteenth inch in length.

A still further object of the invention is to mold a thermoset plastic ball valve having reinforcing fibers randomly positioned therein and a woven fiber reinforcing structure.

For a better understanding of the present invention, together with other and further objects and features thereof, reference is had to the following description taken in connection with the accompanying drawings, the scope of the invention being pointed out in the appended claims.

BRIEF DESCRIPTION OF THE DRAWINGS

Referring to the drawings.

DESCRIPTION OF THE PREFERRED EMBODIMENT

Figure 1:
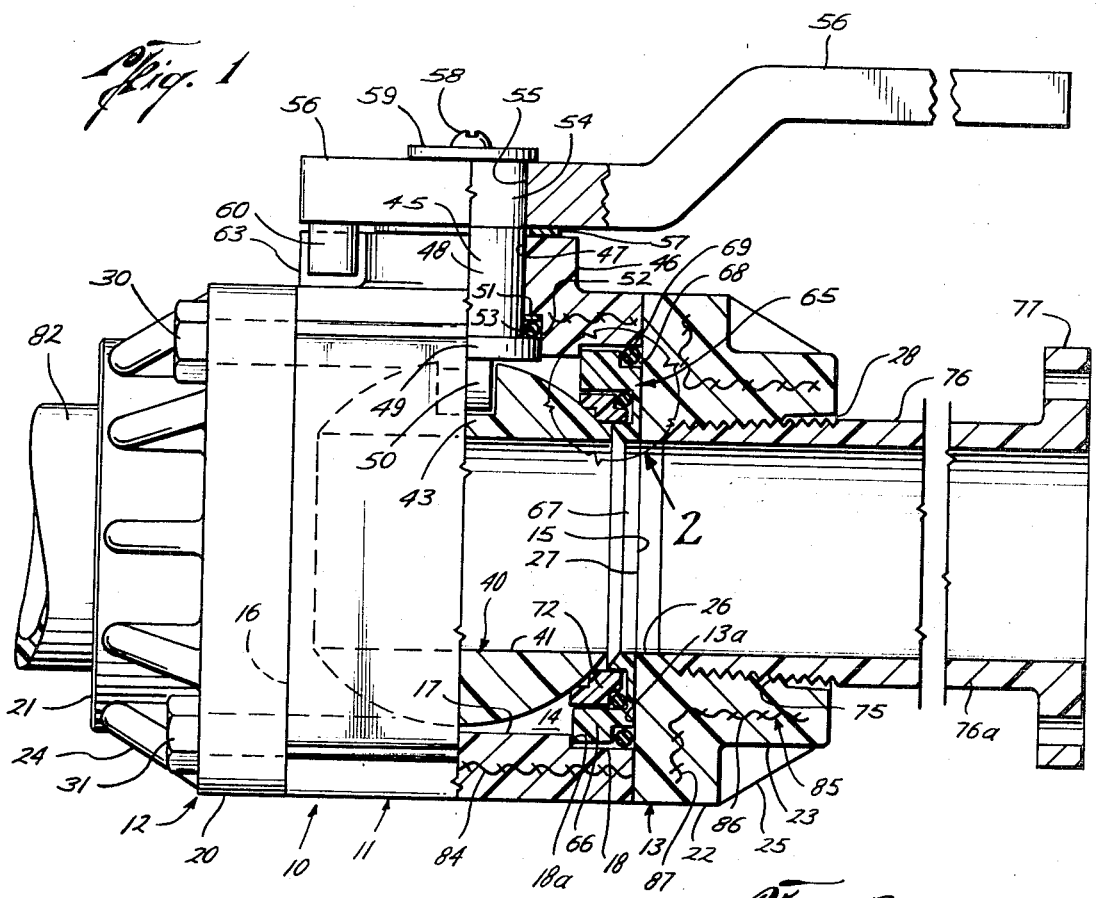
FIG. 1 is a partially cross-sectional elevational view of a plastic ball valve constructed in accordance with the present invention.
Figure 4:
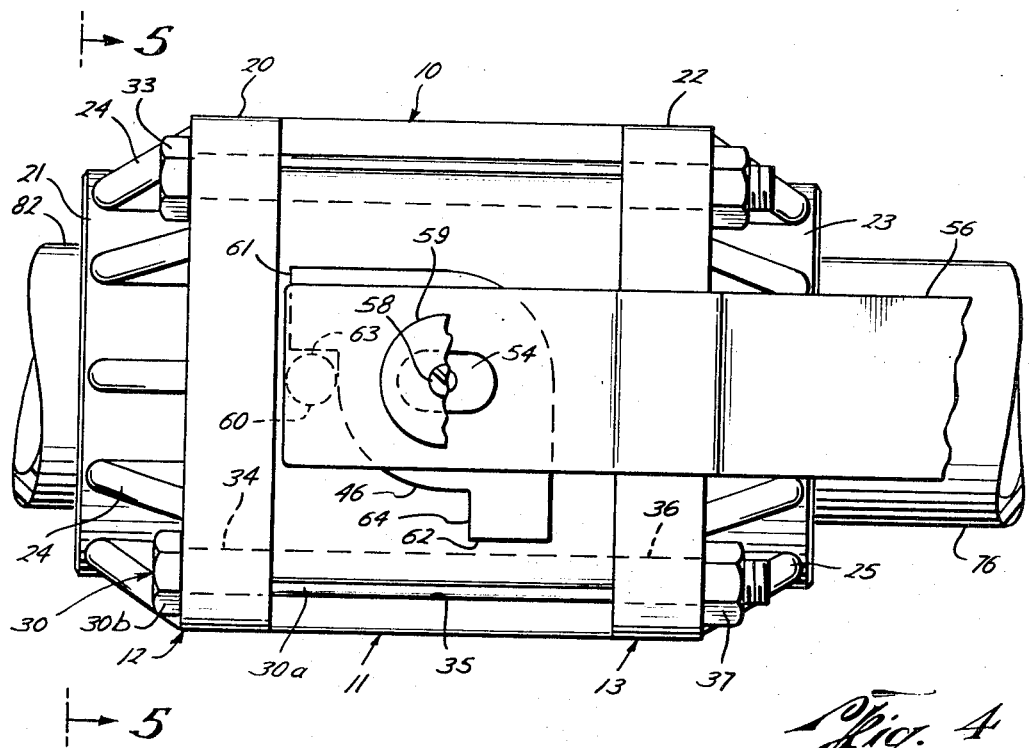
FIG. 4 is a top plan view of the FIG. 1 valve.
Figure 5:
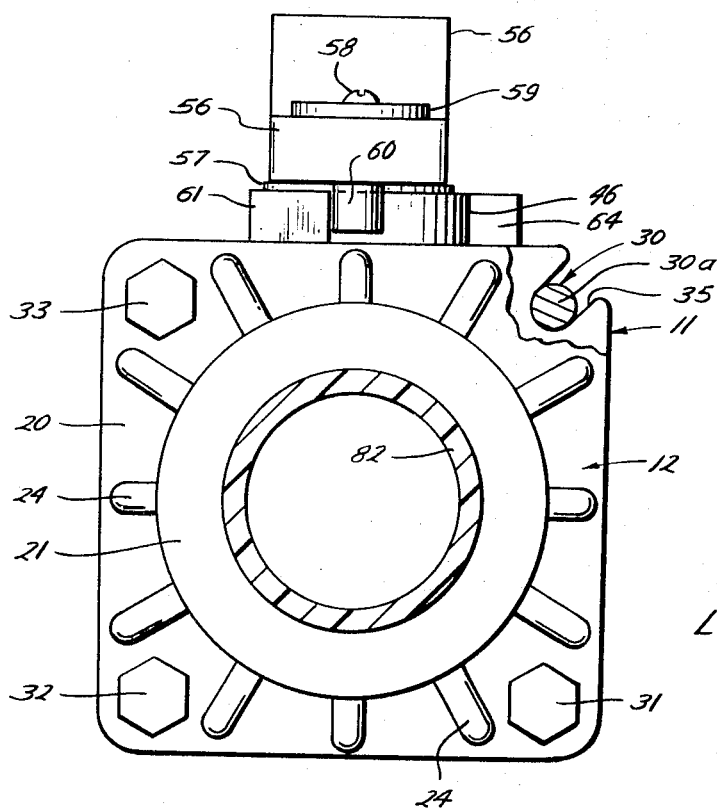
FIG. 5 is an end view of the FIG. 1 valve taken along section line 5—5 of FIG. 4.

Referring to FIGS. 1, 4, and 5, there are shown different views of a representative embodiment of a ball valve constructed in accordance with the present invention. The ball valve there shown includes a housing 10 which is comprised of three parts, a valve body 11 and a pair of end caps or plates 12 and 13 located at opposite ends of the valve body 11. As indicated in FIG. 5, the exterior of the valve body 11 may be of a generally square shape when viewed from the end. As indicated in FIG. 1, the valve body 11 is of a hollow construction to provide an interior valve chamber 14 having circular ports 15 and 16 at opposite ends thereof. Valve chamber 14 extends longitudinally through the body 11 and is of a generally cylindrical shape with the center axis of the cylinder passing through the centers of the circular ports 15 and 16 at the two ends of the valve body. Thus, a cross-sectional view taken at right angles to the plane of the paper in FIG. 1 would show the shape of the valve chamber 14 to be of a circular nature. The cylindrical wall of the valve chamber 14 is indicated at 17. The portion of the valve chamber 14 located immediately adjacent the right-hand port 15 is provided with a counterbore 18, as a consequence of which the diameter of the circular port 15 is somewhat greater than the principle diameter of the valve chamber 14. A similar counterbore is formed in the end of the valve chamber 14 immediately adjacent the left-hand port 16, such counterbore not being visible in the drawings.

The end cap 12 includes a flange portion 20 and a tubular portion 21 extending outwardly therefrom toward the left (as viewed in the drawings) and the end cap 13 includes a flange portion 22 and a tubular portion 23 extending outwardly therefrom toward the right. Each of the end caps 12 and 13 further includes a series of circumferentially spaced support gussets extending between the flange portion and the tubular portion thereof, the gussets for end cap 12 being indicated at 24 and the gussets for end cap 13 being indicated at 25. As indicated in FIG. 5 flange 20 of the end cap 12 may be of a square shape and flange 22 of end cap 13 may be similarly shaped. As indicated in FIG. 1 for the end cap 13, each of the end caps 12 and 13 includes a port therethrough forming a flow passage extending and communicating with the valve body ports at each end of the valve body 11. Thus, end cap 13 includes an internal flow passage 26 having an opening or port 27 which port is provided with a counterbore 28 at its outer end. The center axis of the flow passage 26 is in alignment with the center axis of the cylindrical flow passage of valve chamber 14. The port 27 is in alignment with and communicates with the right-hand valve body port 15. The other end cap 12 is provided with an internal flow passage (not shown) of this same configuration and having a port communicating with the left-hand valve body port 16, which port includes a counterbore at its outer end.

The end caps 12 and 13 are releasably secured to the valve body 11 by releasable fastening means which, in the present embodiment, takes the form of a set of four tie bolts 30, 31, 32, and 33 which are removably carried by the end caps 12 and 13 and which individually extend between such end caps. Considering only the tie bolt 30 in detail and referring in particular to FIG. 4, it is seen that such tie bolt includes a bolt shaft 30a and a bolt head 30b. The bolt shaft 30a extends through a passageway 34 in the flange 20 of the end cap 12, runs along a groove 35 (see FIG. 5) formed in the corner of the valve body 11 and passes through a passageway 36 in the flange 22 of the end cap 13. A nut 37 is threaded onto the right-hand end of the bolt shaft 30a and is tightened to provide the desired clamping of the end caps 12 and 13 to the valve body 11. The groove 35 extends the length of the valve body 11 and is cut inwardly into the valve body 11 from a corner thereof in a radial direction toward the center of the valve body 11. The remaining tie bolts 31, 32 and 33 are mounted in the same manner as the tie bolt 30 and each is provided with a cooperating nut at the free end thereof.

Figure 3:
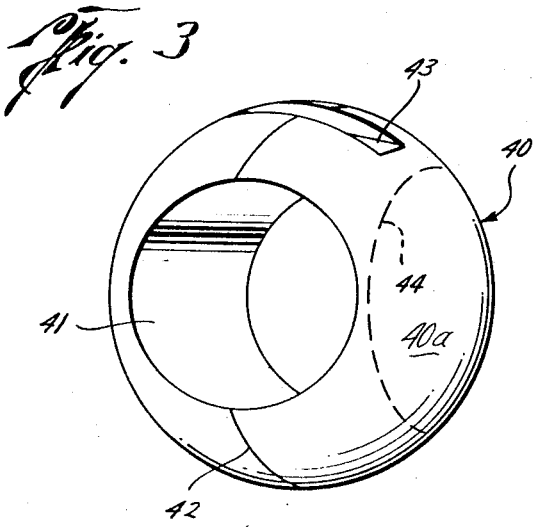
FIG. 3 is a perspective view of the valve ball used in the FIG. 1 valve.

The ball valve of the present invention further includes a plastic valve ball 40 which, as shown in FIG. 1, is rotatably mounted in the valve chamber 14. A perspective view of the valve ball 40, taken by itself, is shown in FIG. 3. The valve ball 40 includes a diametrically extending cylindrical flow passage 41 extending through the body thereof which flow passage 41 can be rotated into alignment with the ports 15 and 16 to thereby form a flow passage through the valve body 11. This flow passage 41 is of a circular cross-sectional shape. The valve ball 40 is a molded plastic structure and the molds are constructed so that the mold parting line represented at 42 formed on the surface of the valve ball 40 during the molding process lies in a plane that passes through the valve ball 40 between the portions on the solid sides of the ball 40 which portions are engaged by the sealing assemblies. In other words, the mold parting line represented at 42 can be anywhere on the ball 40 between the portion represented in broken line at 44 and a similar portion (not shown) on the opposite side of the ball 40. As shown in FIG. 3 for purposes of illustration only, the mold parting line passes through both the center axis of the valve ball flow passage 41 and the axis of rotation of the valve ball 40. As will be seen, this axis of rotation, for the views of FIGS. 1 and 3, is a vertical axis passing through the center of the valve ball 40 and, as such, runs at right angles to the longitudinal center axis of the valve ball flow passage 41. A slot 43 is formed across the top of the valve ball 40 for use in controlling the rotational position of such valve ball 40. The bottom of slot 43 runs along a chord line for the circular cross-section of the valve ball 40, such slot 43 running at right angles to the axis of flow passage 41.

By arranging the mold parting line 42 as described, the surface portion represented at 40a on opposite sides of ball 40 that is surrounded by dotted line 44 as shown on the right in FIG. 3 need not necessarily be ground or polished for forming a seal with the seal structures to be described.

As will be seen, when the valve is in a closed condition, a pair of annular sealing assemblies associated with the valve body ports 15 and 16 engages the opposite solid sides of the ball 40, the annular line of contact for one of these sealing assemblies on one side of the valve ball being represented by broken line 44 in FIG. 3.

The rotational position of the valve ball 40 is controlled by means of a rotatable valve stem assembly 45 which extends vertically through the top wall of the valve body 11. More particularly, the valve body 11 includes a raised neck portion 46 which extends upwardly from the top thereof. A vertically extending cylindrical passageway 47 extends downwardly through the interior of the neck portion 46 and into the interior of the valve body 11, the lower end of such passageway 47 opening into the valve chamber 14. Valve stem assembly 45 includes a cylindrical shaft portion 48 which is rotatably carried in the neck passageway 47. The valve stem assembly 45 further includes a circular flange 49 formed at the lower end of the shaft 48 and a rectangular tongue or stem blade 50 formed at and extending downward from the under side of the flange 49. Stem blade 50 is adapted to be seated in the slot 43 in the top of the valve ball 40. Stem blade 50 fits snugly in the slot 43 so that any rotation of the stem blade 50 is immediately transferred to the valve ball 40. An annular stem seal washer 51, which may take the form of a Teflon thrust washer, encircles the stem shaft 48 and bears against an annular seal ring 53 seated in counterbore 52 formed at the lower end of the neck passageway 47. The annular seal ring 53 rests on the stem flange 49. Seal washer 51 and seal ring 53 provide a fluid tight seal between the valve stem 45 and the valve body 11.

The upper end of the shaft 48 is cut away on each side to provide a generally oval-shaped portion 54 which extends through a similarly shaped passageway 55 at one end of a control handle 56. A washer 57 is disposed on the stem shaft 48 intermediate the handle 56 and the top of the neck portion 46. The handle 56 is held in place on the valve stem assembly 45 by means of a retainer screw 58 which passes through a washer 59 and is threaded into the body of the valve stem assembly 45. The valve stem end of the handle 56 includes a post or lug 60 which extends downwardly from the under side thereof. As best seen in FIG. 4, the neck portion 46 includes a pair of outwardly extending wings 61 and 62 respectively, having vertically extending abutment surfaces 63 and 64 which are spaced apart about the axis of the valve stem 45 by an angle of 90°. These abutment surfaces 63 and 64 cooperate with the handle lug 60 to limit further rotation of the handle 56 when it reaches either the full open or the full closed position, the former occurring when lug 60 contacts abutment surface 63 and the latter occurring when the lug 60 contacts the abutment surface 64.

With reference to FIG. 1, the ball valve there shown includes a first annular sealing assembly referred to generally at 65 located at the right-hand port 15 of the vaLve chamber 14 for providing a fluid tight seal between the valve ball 40, which may be nonspherical and the right-hand end cap 13. The ball valve also includes a second annular sealing assembly (not shown) located at the left-hand port 16 of the valve chamber 14 for providing a fluid tight seal between the valve ball 40 and the left-hand end cap 12. This second annular sealing assembly is of the same construction as the first sealing assembly 65 and, hence, only the details of the latter will be considered.

Figure 2:
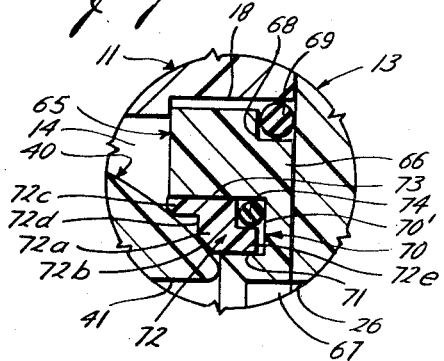
FIG. 2 is an enlarged cross-sectional view of a portion of the FIG. 1 valve illustrating the floating seal arrangement for the plastic ball.

FIG. 2 shows an enlarged cross-sectional view of the upper portion of the right-hand sealing assembly 65 of FIG. 1. As thus seen from FIGS. 1 and 2, the annular sealing assembly 65 includes an annular support member or backup ring 66 which is carried within the counterbore 18 at the right-hand end of the valve chamber 14. The center opening 67 of the backup ring 66 is of the same diameter as the adjoining portion of the flow passage 26 through the end cap 13. The outer diameter of the backup ring 66 is somewhat less than the diameter of the counterbore 18 so as to leave sufficient clearance therebetween to permit some radial movement of the backup ring 66. This total radial clearance may approximate about up to one-eighth inch, but this may vary and the foregoing is given by way of example only. The axial dimension or extent of the ring 66, on the other hand, is such as to prevent any substantial axial movement of the ring 66 within the recess 18. As shown in FIG. 1, the backup ring 66 abuts on the shoulder 18a of the counterbore at the surface 13a of the end plate 13. By "radial" movement is meant movement in a direction at right angles to the center axis of the flow passage passing through the housing 10, while "axial" movement is taken to mean movement in a direction parallel to such flow passage center axis.

The outer right-hand corner of the annular backup ring 66 is provided with an annular recess 68. An annular resilient member or seal ring 69 is located in the recess 68 between the backup ring 66 and the counterbore 18 and the face or surface 13a. In addition to providing a fluid tight seal, the resilient character of the seal ring 69 tends to center the backup ring 66 within the counterbore 18, provided no other factors exist requiring the backup ring 66 to assume an off centered condition, as will be explained.

The annular support member or backup ring 66 further includes a second and larger annular recess 70 which is generally U-shaped in cross-section and is spaced radially inward relative to recess 68. The recess 70 faces inwardly toward the interior of the valve chamber 14, as shown in the drawings. The U-shaped recess 70 includes the shoulders 71 and 73 joined by the base 70'.

The annular sealing assembly 65 further includes an annular sealing element 72 carried by the backup ring recess 70 and shaped to undergo axial but not radial movement within recess 70, except that which may occur by compression of seal 72. This sealing element 72 includes an annular body portion 72a having a contoured inner corner 73b for sealingly engaging the valve ball 40. The sealing element 72 also includes a first axially extending annular portion 72c located at the radially outward side of the body portion 72a and extending axially into engagement with the valve ball 40. Its end may be slightly contoured if desired to aid in sealing with the valve ball surface. As thus formed, the side of the sealing element 72 which engages the valve ball 40 includes an intermediate annular notch or recess 72d, the trough of which does not engage the valve ball 40. The sealing element 72 further includes a second axially extending annular portion 72e located at the radially inward side of the body portion 72a and extends in a direction axially opposite to portion 72c and into the annular groove 70 of the backup ring 66. The configuration of groove 70 aids in preventing the sealing element 72 from being sucked inwardly and caught by the edge of the valve ball port when the valve is being closed.

By way of explanation and example, when the ball is rotated towards closed position, the same amount of fluid is trying to go through a smaller opening. That is, the opening in the ball valve is moved so that it is not aligned with ports 15 and 16, thus the opening through the valve is reduced. This may increase the velocity of the fluid passing through the valve which in turn decreases the pressure so that the seal may be sucked into the ball port or passage 41. The edge of the passage upon continued movement of the ball may tend to cut or tear the seal or pull it out of position. The axial length or extent of the sealing element 72 and, in particular, the axial length of the lower portion 72e is such as to allow for some axial movement of the sealing element 72 in the groove 70, as illustrated in FIG. 2 of the drawings.

The sealing assembly 65 further includes another annular resilient member, which may be designated a pusher ring 74, located intermediate the sealing element 72 and the support member recess or groove 70 for urging the sealing element 72 against the valve ball 40. This pusher ring 74 is located in the annular notch or recess formed in the body portion 72a of the sealing element 72 as shown in FIG. 2. The resilient nature of pusher ring 74 causes it to behave like a spring and serves to provide a desired axial preloading force on the sealing element 74 which, in turn, urges the sealing element 72 against the valve ball 40 with a desired and more or less constant force. A similar sealing assembly is provided on the left-hand side of the valve adjacent end cap 12. Thus, the ball valve 40 is cradled between the sealing elements 72 at each end thereof. This aids in maintaining a proper seal at all times with the ball valve whether in open or closed position and even though the ball valve may be nonspherical from the molding process also, the arrangement of the components of the seal assembly 65 enables a proper seal to be maintained in that it compensates for varying dimensions of the valve chamber which may occur when the same mold is used for different thermoset plastics.

Considering now one manner of connecting the ball valve of the present invention into a fluid flow line and considering in detail only the right-hand end cap 13, the flow passage 26 extending through the interior of such end cap 13 includes a female threaded portion 75 for receiving the threaded end of an externally threaded pipe represented at 76, that constitutes part of a fluid flow line. The female threaded portion 75 of the end cap flow passage 26 is spaced inwardly from the counterbore 28 of the end cap 13, the counterbore 28 having a diameter greater than the maximum diameter of the threaded pipe portion to be received through such counterbore 28. This arrangement of the threads in the end caps serves to aid in preventing the buildup of detrimental outward or radial forces which might otherwise be produced if the threads were formed in counterbore 28. In other words, if the female threads 75 had been located to start on the surface of counterbore 28, then the stresses produced by the taper normally present on most pipe threads might expand the end cap 13 a significant and undesirable amount.

The internal construction of the left-hand end cap 12 is the same as that just described for the right-hand end cap 13. A segment of flow line pipe 82 is shown as being threaded into the left-hand end cap 12 in a manner as described with regard to pipe 76. In some instances, it may be desirable to chemically weld pipes 76 and 82 into the end plates 13 and 12 and the counterbore 28 enables the pipes to be so connected when desired.

In other instances, it will be desirable to provide a flange arrangement for connecting the valve in a flow conduit. In such event, the section of designated pipe 76, 76a may be integrally formed with end plate 13. It will be noted that a flange 77 is integrally formed on pipe section 76a and this may be connected with a similar flange (not shown) on a pipe (not shown) whereby the valve including the end plates 12 and 13 and pipe sections with the flanges may be removed from a flow line. Of course, the left-hand side of the valve is provided with a similar arrangement above described for connection in a flow line. The flanges on the pipe sections and the flanges on the flow lines are connected in any well known manner.

Considering now the materials from which the various parts of the valve are made, all of the various parts of the valve may be made of plastic or synthetic material with the exception of the tie bolts 30-33 and cooperating nuts and, optionally, the handle 56, the handle retainer screw 58 and the associated washer 59. The tie bolts 30-33 and the cooperating nuts are preferably made of metal. The composition of the handle 56 is not critical and it may be made of either metal or plastic. All of the remaining larger sized elements of the valve, namely, the valve body 11, the end caps 12 and 13, the valve ball 40, the valve stem assembly 45 and the annular support ring or backup ring 66, are made of fiber reinforced thermosetting plastic material. The reinforcing fibers are preferably glass fibers and the thermosetting plastic material is preferably selected from the group consisting of epoxy, polyester, phenolic, vinyl ester and melamine resins. For the case of the housing members, namely, the valve body 11 and the end caps 12 and 13, as well as the valve stem assembly 45, the reinforcing fibers are randomly embedded in the plastic material. Any amount up to approximately 99 percent of the total number of fibers is greater than one-sixteenth an inch in length, and preferably at least the majority of the fibers is greater than one-sixteenth an inch in length. The ratio of fiber to resin and catalyst is in any suitable amount to accomplish the desired results.

The sealing element 72 which engages the valve ball 40 and the corresponding sealing element at the opposite end of the valve chamber 14 are preferably made of Teflon which is polytetrafluoroethylene. For some applications, these ball sealing elements may instead be made of an elastomer material such as, for example, Viton (a fluorocarbon elastomer), Neoprene or butyl rubber. The resilient pusher ring 74 and the resilient body seal ring 69 of the sealing assembly 65 (and the corresponding elements in the sealing assembly at the opposite end of the valve chamber 14) are made of an elastomer material such as for example, Viton, Neoprene, or butyl rubber. The valve stem seal washer 51, the valve stem seal ring 53 are preferably made of Teflon.

In order to further strengthen the housing 10, various preshaped woven structures may in some instances be embedded in the plastic material forming the various parts thereof. Thus, a preformed cylindrical-shaped woven structure 84 may be embedded in the thermosetting plastic material forming the valve body 11. This woven structure or woven sleeve 84 is placed in the mold during the molding of the valve body 11 and the fiber reinforced thermosetting plastic is then placed in the mold so as to completely immerse the woven sleeve 84. The preshaped woven structure for the end cap 13 is illustrated in the form of a preformed open ended hat-shaped woven structure 85. As such, the woven structure 85 includes a cylindrical portion 86 encircling the end cap flow passage 26 and a flange portion 87 extending radially within the flange portion 22 of the end cap 13. The preformed woven structure 85 is placed in the end cap mold before the placing of the fiber reinforced thermosetting plastic material in the mold. A corresponding hat-shaped woven structure is also embedded within the body of the end cap 12 at the opposite end of the valve body 11. These preformed woven structures 84 and 85 are preferably of a relatively coarse weave and may, for example, be made from a woven fiberglass cloth material.

The structures 84 and 85 provide additional strength where the valve is to be employed at higher pressures. The structures 84 and 85 are "positioned" as opposed to being "randomly arranged" within the thermosetting mass, as is the case of the reinforcing fibers. Of course, the reinforcing and thermosetting plastic form a homogeneous mass when hardened, whether the reinforcing includes only the fibers or the fibers and the woven structures.

Considering briefly the operation of the above-described ball valve, FIGS. 1, 4 and 5 show such valve in an open condition. In this condition, the flow passage 41 of the valve ball 40 is in alignment with the circular openings 67 in the backup ring 65 at each end of the valve and with ports 27 in the end plates 12 and 13 as well as at the end of the flow passage 26 through the end plates 12 and 13. Pipe or conduit is connected to the end plates 12 and 13 in any one of the several manners as previously described and thus communication from the pipe on one side of the valve with pipe on the other side is established. To close the valve, the valve handle 56 is rotated through an angle of 90° so as to extend at right angles to the housing flow passage. This rotates the ball valve 40 through an angle of 90° and places the solid sides of the valve ball 40 in engagement with the annular sealing assemblies (e.g., sealing assembly 65) at the two ends of the valve chamber 14. The outermost line of contact between the sealing assembly 65 and the valve ball 40 is indicated by broken line 44 in FIG. 3. In this condition, the valve chamber ports are closed and fluid cannot flow through the valve.

The novel ball seal assemblies (e.g., assembly 65) used at the two ends of the valve chamber 14 increase the useful life of the valve and reduce the cost of manufacturing the valve. In particular, the floating or self-adjusting character of the ball seal assemblies acts to compensate for valve part wear. Such seal arrangement allows immediate sealing if fluid flow is reversed; that is, the valve of the present invention may function with fluid flow in either direction. For example, if the valve ball 40 or the sealing element 72 should become worn and suffer some change in shape, then the resilient members of the ball seal assembly 65 act to adjust the position of the sealing element 72 so as to continue to provide a reliable fluid tight seal. This self-adjusting feature of the ball seal assemblies also reduces the initial manufacturing costs. In particular, they reduce the sphericity requirements for the valve ball 40. Such valve ball 40 does not have to have a high degree of sphericity. It can be somewhat out of round because the ball seal elements will adjust themselves to take this into account. This self-adjusting feature together with the fact that the mold parting line 42 on the valve ball 40 is located so that it does not cross the line of contact with the sealing elements of the ball seal assemblies, means that it is not necessary that the valve ball 40 be machined or polished so as to provide a smooth and perfectly spherical external surface. This, in turn, reduces the cost of manufacture of the valve ball.

The floating seal arrangement permits valves formed of various thermosetting resins to be formed from the same mold. Since the length of the valve chamber dimension may not be maintained exact due to the difference in shrinkage, etc., between one thermoset plastic and another, the floating seal arrangement will compensate for such dimensional variations and function to seal properly.

The variations of thermoset plastic permits the selection of a specific thermoset plastic for a particular use. For example, phosphoric acid is detrimental to epoxy resin, while it has little effect on a polyester resin, even at elevated temperatures.

A further feature of the invention is the relative ease with which the movable parts of the valve may be repaired or replaced after the valve has been in operation for a period of time. Assuming that the valve is connected in place in a fluid flow line, then all that is required in order to replace any of the moving valve parts is to unfasten and remove the tie bolts 30–33 and then to remove the central valve body portion 11 from between the end caps 12 and 13. It is not necessary to disturb the fluid flow line pipes or to remove the end caps 12 and 13 from such pipes. The new or repaired valve body 11 is put back in the flow line by moving it back into position between the end caps 12 and 13, inserting the tie bolts 30–33 and replacing and tightening the nuts on the free ends thereof.

While there has been described what is at present considered to be a preferred embodiment of this invention, it will be obvious to those skilled in the art that various changes and modifications may be made therein without departing from the invention, and it is, therefore, intended to cover all such changes and modifications as fall within the true spirit and scope of the invention.

What is claimed is:

1. A ball valve comprising:
   a. a fiber reinforced thermoset plastic body having a valve chamber extending longitudinally therethrough
   b. a fiber reinforced thermoset plastic nonspherical valve ball rotatably mounted in the valve chamber and having a flow passage extending therethrough;
   c. valve stem means extending through the wall of the body for enabling rotation of the valve ball;
   d. an end cap at each end of said valve body, each end cap having a flow passage extending therethrough for communicating with the valve chamber;
   e. an annular sealing assembly located adjacent each end of the valve chamber for providing a fluid tight seal with said valve ball; and
   f. the valve chamber including a counterbore at each end and the annular sealing assemblies each including:
      1. an annular support member for each of the counterbores in the valve chamber, said annular support member having a first annular recess adjacent the counterbore and a second annular recess formed on a radially inward portion of said support member and facing inwardly toward the interior of the valve chamber;
      2. a first annular resilient member located in the first annular recess intermediate said annular support member and the counterbore for radially positioning said annular support member within the counterbore;
      3. an annular sealing element in the second annular recess of said support member; and
      4. a second annular resilient member located intermediate said sealing element and said second annular recess in said support member for cradling and urging said sealing element against the valve ball.

2. A ball valve in accordance with claim 1 wherein said support members are made of a fiber reinforced thermosetting plastic material, said sealing elements are made of Teflon and said resilient members are made of an elastomer.

3. A ball valve in accordance with claim 1 wherein the side of each sealing element which engages the valve ball includes a recess, the trough o which does not engage the valve ball.

4. A ball valve in accordance with claim 1 wherein the second annular recess in each of said annular support members is in the form of a generally U-shaped groove facing inwardly toward the interior of the valve chamber and said sealing element is seated within this groove whereby the radially inward shoulder of the groove inhibits any radially inward movement of said sealing element.

5. A ball valve in accordance with claim 4 wherein each annular sealing element includes an annular body portion having an inner corner which engages the valve ball, a first axially extending annular portion located at the radially outward side of the body portion and extending axially into engagement with the valve ball and a second axially extending annular portion located at the radially inward side of the body portion and extending axially into the annular groove of the support member, the cooperating second annular resilient member being located in the shoulder formed by the body portion and the second axially extending portion of the sealing element.

6. A ball valve in accordance with claim 1 wherein the flow passages through said end caps each include a female threaded portion for receiving the threaded end of an externally threaded pipe, such female threaded portions being spaced inwardly from the outer end of each respective cap end by counterbores in each cap end which has a diameter greater than the maximum diameter of the threaded pipe portion to be received therein.

7. A ball valve in accordance with claim 1 including releasable fastening means for securing said end caps to said valve body, said releasable fastening means including bolt means extending between said end caps.

8. A ball valve in accordance with claim 1 wherein each of the valve body and end caps has embedded in the thermosetting plastic material forming same a preshaped woven structure.

9. A ball valve in accordance with claim 8 wherein the woven structure embedded in the thermosetting plastic material forming the valve body is cylindrically-shaped which encircles the valve chamber located in the valve body, and wherein the woven structure embedded in the thermosetting plastic material forming each end cap is open ended and hat-shaped.

10. A ball valve in accordance with claim 1 wherein each end cap is in the form of a flanged pipe with the flange portion engaging the valve body and the pipe portion extending outwardly therefrom.

11. A ball valve in accordance with claim 10 wherein each end cap includes a circumferentially spaced series of support gussets extending between the flange portion and the pipe portion thereof.

12. The invention of claim 1 wherein the valve body, end caps, valve ball, and valve stem means are made of randomly located, fiber reinforced thermosetting plastic material, wherein for the valve body, end caps, and valve stem means any amount up to approximately 99 per cent of the randomly located reinforcing fibers are greater than one-sixteenth of an inch in length.

* * * * *